Nov. 27, 1934.  M. J. COYNE  1,982,573
FISHING TACKLE
Filed Dec. 12, 1933
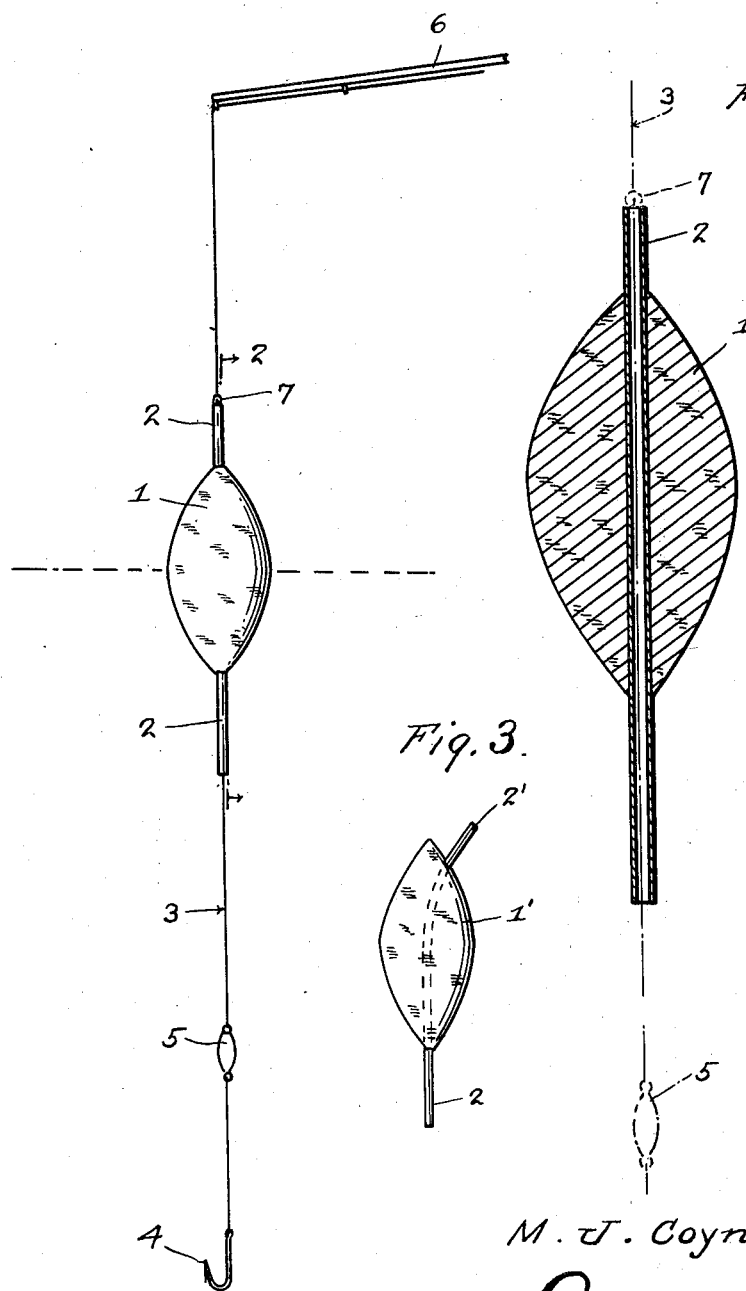
Inventor
M. J. Coyne
By Clarence A. O'Brien
Attorney Patented Nov. 27, 1934

1,982,573

UNITED STATES PATENT OFFICE 1,982,573

FISHING TACKLE

Martin John Coyne, East Syracuse, N. Y.

Application December 12, 1933, Serial No. 702,072

2 Claims. (Cl. 43—49)

This invention relates to improvements in fishing tackle, the general object of the invention being to provide a bob having a tubular part through which the line passes freely, with a stop adjacent the hook for engaging the bob when the line is pulled from the water to remove the bob with the line, and a second stop above the bob for limiting downward movement of the line, the last mentioned stop being adjustable so that the hook can be spaced the desired distance from the bob, when the line is in the water.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view showing the invention in use.

Figure 2 is a section on line 2—2 of Figure 1.

Figure 3 is a view of a modified form of bob.

In this drawing, the bob 1 is shown of cork, though it may be made in any other suitable form to provide a buoyant body. A tube 2 passes through the longitudinal center of the body and freely receives the line 3 which has the hook 4 at its lower end and a sinker 5 attached thereto above the hook. The pole is shown at 6 and a stop 7 is placed in the line above the bob. This stop may be a knot formed in the line or a suitable device adjustably connected to the line, as this stop may be adjustable so that when the tackle is in use, as shown in Figure 1, the hook 4 will be at the desired depth in the water.

When the line is pulled from the water, the line will run through the tubular member until the sinker 5 strikes the lower end of the tubular member and when this happens, the bob will move out of the water with the line. When the line is placed in the water, as soon as the bob strikes the surface of the water, it comes to rest and the line will pass through the tubular member under the weight of the hook and of the sinker until the stop 7 engages the upper end of the tubular member and the line comes to rest.

Figure 3 shows a modification in which the tubular member 2' passes from the body 1' through a side part thereof below the upper end of the body, a portion of the tubular member being curved, as shown in dotted lines in Figure 3, to permit this.

As will be seen, the line runs freely through the bob and the knot or stop 7 is held against the upper end of the tubular member by the weight of the sinker, and when the line is pulled from the water, the line runs through the bob until the sinker strikes the lower end of the tubular member when the bob is pulled from the water with the line, and by placing the knot or stop 7 at the proper distance in the line from the hook, the hook will be at the proper depth at which the fisherman wishes to fish.

By using a long tubular member or stem, visibility is improved and the shape of the bob will cause it to assume the proper position in the water under the weight of the sinker.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A fishing device of the class described comprising a line including a sinker, a bob having a tubular stem passing therethrough and through which the line freely passes, said sinker engaging the lower end of the stem when the line is pulled from the water, a stop on the line above the bob for engaging the upper end of the stem for limiting downward movement of the line, said stem having its upper portion passing through a side part of the bob below the upper end thereof with the upper end of the stem spaced an appreciable distance from that part of the bob through which the upper portion passes.

2. A fishing device of the class described comprising a line, a bob, a weight on the lower part of the line, guiding means carried by the bob through which the line freely passes, a stop on the line above the bob for limiting downward movement of the line through the guiding means, said weight engaging the guiding means, when the line is pulled out of the water, to cause the bob to move with the line, the upper end of the guiding means being located substantially in a vertical plane which touches a side wall of the bob at the widest portion of the bob, whereby the upper portion of the line is held in spaced relation from the side portion of the upper part of the bob.

MARTIN JOHN COYNE.